(12) United States Patent
Ghelfi et al.

(10) Patent No.: US 10,170,832 B2
(45) Date of Patent: Jan. 1, 2019

(54) TRANSCEIVER FOR A PHASED ARRAY ANTENNA

(71) Applicant: TELEFONAKTIEBOLAGET LM ERICSSON (PUBL), Stockholm (SE)

(72) Inventors: Paolo Ghelfi, Pisa (IT); Antonella Bogoni, Pisa (IT); Francesco Laghezza, Pisa (IT); Daniel Onori, Pisa (IT); Filippo Scotti, Pisa (IT); Giovanni Serafino, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 56 days.

(21) Appl. No.: 15/501,907

(22) PCT Filed: Aug. 20, 2014

(86) PCT No.: PCT/EP2014/067776
§ 371 (c)(1),
(2) Date: Feb. 6, 2017

(87) PCT Pub. No.: WO2016/026528
PCT Pub. Date: Feb. 25, 2016

(65) Prior Publication Data
US 2017/0244165 A1 Aug. 24, 2017

(51) Int. Cl.
*H04B 10/00* (2013.01)
*H01Q 3/26* (2006.01)
(Continued)

(52) U.S. Cl.
CPC ........... *H01Q 3/2676* (2013.01); *H01Q 1/246* (2013.01); *H01Q 21/22* (2013.01);
(Continued)

(58) Field of Classification Search
CPC ...... H01Q 3/2676; H01Q 1/246; H01Q 21/22; H04B 10/25758; H04B 10/40; H04B 10/505; H04B 10/64; H04B 10/2507
(Continued)

(56) References Cited

U.S. PATENT DOCUMENTS 5,526,170 A 6/1996 Esman et al.
7,499,653 B2 * 3/2009 Yap .................. G02F 2/002
398/115
(Continued)

FOREIGN PATENT DOCUMENTS

WO 2013164009 A1 11/2013
WO 2015028091 A1 3/2015

OTHER PUBLICATIONS

Frankel et al., "Fiber-Optic True Time Steering of an Ultrawide-Band Receive Array," IEEE Transactions on Microwave Theory and Techniques, Aug. 1997, vol. 45, No. 8.
(Continued)

*Primary Examiner* — Tesfaldet Bocure
(74) *Attorney, Agent, or Firm* — Sage Patent Group

(57) ABSTRACT

A transceiver for a phased array antenna comprises a laser light source arranged to provide an optical spectrum comprising a plurality of spaced wavelengths. The transceiver further comprises a dispersion unit arranged to introduce a delay to a plurality of spectral components of the optical spectrum associated with the spaced wavelengths. The delay is dependent on the wavelength of the spectral components of the optical spectrum. The transceiver further comprises a first optical filter configured to select a plurality of spectral components received from the dispersion unit. The transceiver further comprises a first heterodyning device configured to generate a signal for transmission by the phased array antenna by heterodyning the selected spectral components associated with different ones of the spaced wave-
(Continued)

lengths of the laser light source. The transceiver is configured to receive signals from the phased array antenna. The transceiver further comprises a modulator configured to modulate spaced wavelengths from the said laser light source with the received signals. The spaced wavelengths are associated with the spectral components used to generate the signal for transmission. The transceiver further comprises a second heterodyning device configured to heterodyne spectral components associated with different ones of the spaced wavelengths of the laser light source.

35 Claims, 6 Drawing Sheets

(51) Int. Cl.
| | |
|---|---|
| H01Q 1/24 | (2006.01) |
| H04B 10/2575 | (2013.01) |
| H01Q 21/22 | (2006.01) |
| H04B 10/2507 | (2013.01) |
| H04B 10/40 | (2013.01) |
| H04B 10/50 | (2013.01) |
| H04B 10/64 | (2013.01) |

(52) U.S. Cl.
CPC ..... *H04B 10/2507* (2013.01); *H04B 10/2575* (2013.01); *H04B 10/25758* (2013.01); *H04B 10/40* (2013.01); *H04B 10/505* (2013.01); *H04B 10/64* (2013.01)

(58) Field of Classification Search
USPC .......................................................... 398/115
See application file for complete search history.

(56) References Cited

U.S. PATENT DOCUMENTS

| | | | | |
|---|---|---|---|---|
| 2006/0239686 | A1* | 10/2006 | Hillis | H01Q 3/26 |
| | | | | 398/115 |
| 2007/0206958 | A1 | 9/2007 | Chen et al. | |
| 2016/0211578 | A1* | 7/2016 | Ghelfi | H01Q 3/2676 |

OTHER PUBLICATIONS

Ghelfi et al., "Flexible receiver for multiband orthogonal frequency division multiplexing signals at the millimeter waveband based on optical downconversion," Optics Letters, Sep. 15, 2012, vol. 37, No. 18.

Ghelfi et al., "Phase Coding of RF Pulses in Photonics-Aided Frequency-Agile Coherent Radar Systems," IEEE Journal of Quantum Electronics, Sep. 2012, vol. 48, No. 9.

Ghelfi et al., "Photonic generation and independent steering of multiple RF signals for software defined radars," Optics Express, Sep. 23, 2013, vol. 21, No. 19.

Ghelfi et al., "Photonic generation of RF multiple carriers using a mode-locked laser and a single photodiode," Proceedings of SPIE vol. 7960: Coherent Optical Communication: Components, Subsystems, and Systems, Jan. 25, 2011.

Goutzoulis et al., "Hybrid electronic fiber optic wavelength-multiplexed system for true time-delay steering of phased array antennas," Optical Engineering, Nov. 1992, vol. 31, No. 11.

Jeon et al., "Optical True Time-Delay for Phased-Array Antenna System Using Dispersion Compensating Module and a Multi-wavelength Fiber Laser," 2012 17th Opto-Electronics and Communications Conference (OECC 2012), Jul. 2012, Busan, KR.

Prince et al., "Variable Delay With Directly-Modulated R-SOA and Optical Filters for Adaptive Antenna Radio-Fiber Access," Journal of Lightwave Technology, Nov. 15, 2009, vol. 27, No. 22.

Scotti et al., "In-Field Experiments of the First Photonics-Based Software-Defined Coherent Radar," Journal of Lightwave Technology, Oct. 15, 2014, vol. 32, No. 20.

Seeds et al., "Microwave Photonics," Journal of Lightwave Technology, Dec. 2006, vol. 24, No. 12.

Serafino et al., "Phase and Amplitude Stability of EHF-Band Radar Carriers Generated From an Active Mode-Locked Laser," Journal of Lightwave Technology, Dec. 1, 2011, vol. 29, No. 23.

Soref, "Optical dispersion technique for time-delay beam steering," Applied Optics, Dec. 10, 1992, vol. 31, No. 35.

Tong et al., "Transmit/Receive Module of Multiwavelength Optically Controlled Phased-Array Antennas," IEEE Photonics Technology Letters, Jul. 1998, vol. 10, No. 7.

Wifi Alliance, "WiGig and the future of seamless connectivity," Wi-Fi Alliance, Sep. 2013.

Yaron et al., "Photonic Beamformer Receiver with Multiple Beam Capabilities," IEEE Photonics Technology Letters, Dec. 1, 2010, vol. 22, No. 23.

Zadok et al., "Optically Controlled Low-Distortion Delay of GHz-Wide Radio-Frequency Signals Using Slow Light in Fibers," IEEE Photonics Technology Letters, Apr. 1, 2007, vol. 19, No. 7.

International Search Report and Written Opinion dated May 4, 2015 in related International Application No. PCT/EP2014/067776.

* cited by examiner

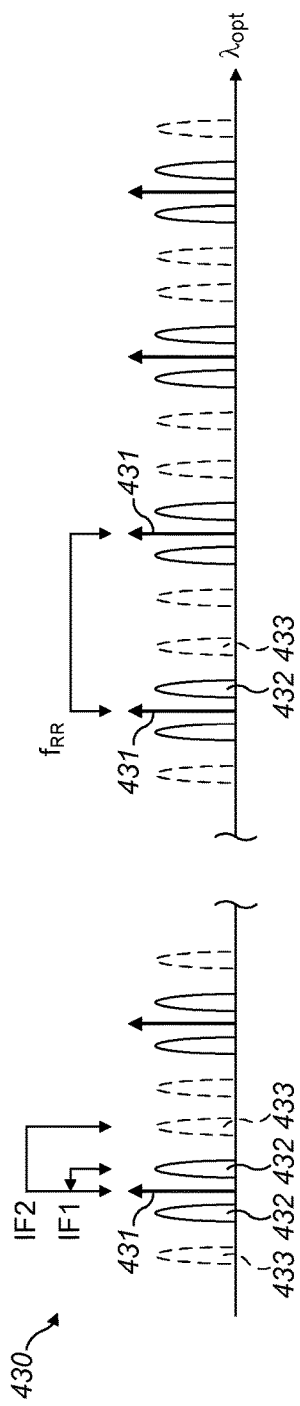
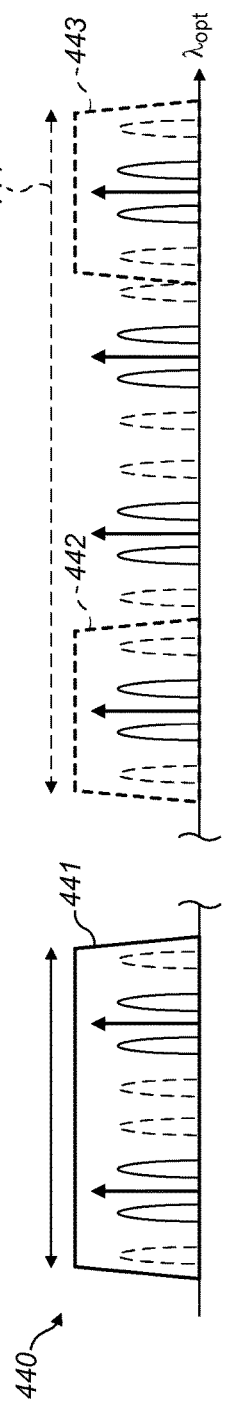
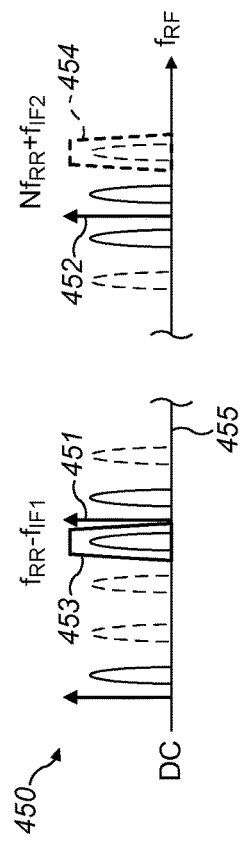
FIG. 4a
FIG. 4b
FIG. 4c

TRANSCEIVER FOR A PHASED ARRAY ANTENNA

TECHNICAL FIELD

Aspects of the invention relate to a transceiver for a phased array antenna, and a method of generating and receiving a signal in a transceiver for a phased array antenna.

BACKGROUND

Currently, the spectrum allocated for mobile communications corresponds to the Ultra-High Frequencies (UHF) band, laying in the 300 MHz-3 GHz frequency range. This spectrum may in the future not be able to host all the traffic generated inside the mobile networks. Spectrum in the millimeter-wave band (MMB), a portion of the radiofrequency (RF) spectrum ranging from 3 GHz to 300 GHz, is at present underutilized.

The generation of ultra-stable RF signals from UHF to MMB is made possible by resorting to photonic technologies, as described in Seeds, A. J. et al., "Microwave Photonics", JLT, vol. 24, Issue 12, p. 4628-4641, December 2006. The use of MMB may involve implementing a beamforming by means of arrayed antennas, so that the range covered by the system is maximized in the desired direction.

Phased array antennas (PAAs) allow steering of transmitted Radio Frequency (RF) beam without physically moving the antenna. Phased array antennas are used in an increasing number of applications such as multifunctional radars and communications.

It is known for PAAs to use electronic phase shifters at each antenna element to control the viewing angle of the array. For broadband signals, this approach suffers from the squint phenomenon, which causes different frequencies of the RF signal spectrum to aim at a different angle. As is also known, squint can be avoided if the phase shifters are substituted by true-time delays (TTDs).

A photonics approach has been proposed for realizing the TTD functionality in PAAs, utilizing the photonics capability of controllable delays with wide bandwidth, avoiding beam squint. Photonics also have with the advantages of low weight and Electro-Magnetic Interference (EMI) insensitivity. An optical tunable TTD has been demonstrated through optical path switching, as described in A. P. Goutzoulis, et al., Opt. Eng., v. 31, pp. 2312-2322, 1992. An optical tunable TTD with dispersive elements is described in K. Prince, et al., IEEE J. Lightwave Technol., v. 27, n. 22 (2009). Such photonics-based solutions require a generation of an RF signal, to which the TTD delay is subsequently added.

SUMMARY

A first aspect of the present invention provides a transceiver for a phased array antenna. The transceiver comprises a laser light source arranged to provide an optical spectrum comprising a plurality of spaced wavelengths, and a dispersion unit arranged to introduce a delay to a plurality of spectral components of the optical spectrum associated with the spaced wavelengths. The delay is dependent on the wavelength of the spectral components of the optical spectrum. The transceiver comprises a first optical filter configured to select a plurality of spectral components received from the dispersion unit, and a first heterodyning device configured to generate a signal for transmission by the phased array antenna by heterodyning the selected spectral components associated with different ones of the spaced wavelengths of the laser light source. The transceiver is configured to receive signals from the phased array antenna. The transceiver comprises a modulator configured to modulate spaced wavelengths from the said laser light source with the received signals. The spaced wavelengths are associated with the spectral components used to generate the signal for transmission. The transceiver further comprises a second heterodyning device configured to heterodyne spectral components associated with different ones of the spaced wavelengths of the laser light source.

Thus, an RF signal is generated directly from an optical signal, which is used to introduce a true time delay for beamforming. The transceiver is configured for transmission of RF signals and receiving RF signals.

A second aspect of the present invention provides a method of generating and receiving a signal in a transceiver for a phased array antenna. The method comprises providing an optical spectrum comprising a plurality of spaced wavelengths, and introducing a delay to a plurality of spectral components of the optical spectrum associated with the spaced wavelengths. The delay is dependent on the wavelength of the spectral components of the optical spectrum. The method further comprises optical filtering to select a plurality of spectral components including the delay, and heterodyning the selected spectral components associated with different ones of the spaced wavelengths of the laser light source to generate a signal for transmission by the phased array antenna. The method further comprises receiving signals from the phased array antenna, and modulating spaced wavelengths of the said optical spectrum with the received signals. The spaced wavelengths are associated with the spectral components used to generate the signal for transmission, and heterodyning spectral components associated with different ones of the spaced wavelengths of the laser light source.

A third aspect of the present invention provides a computer program product, configured when run on a computer to carry out a method as described.

BRIEF DESCRIPTION OF THE DRAWINGS

Embodiments of the present invention will now be described, by way of example only, with reference to the accompanying drawings in which:

FIGS. 4a, 4b and 4c are examples of spectrum handled by the transceiver;

DETAILED DESCRIPTION

Aspects of the present invention relate to generating and managing one or more RF signals to be transmitted by a phased array antenna. In some aspects, the signals are single RF signals or multiple independent RF signals.

Examples of the invention use photonics both for generating at least one wideband RF signal, and for independently managing the time delay to each element of an antenna array.

This provides for a flexible wideband multiple-signal beamforming. Examples of the invention further relate to transmitting and receiving a signal using common components.

Figure 1:
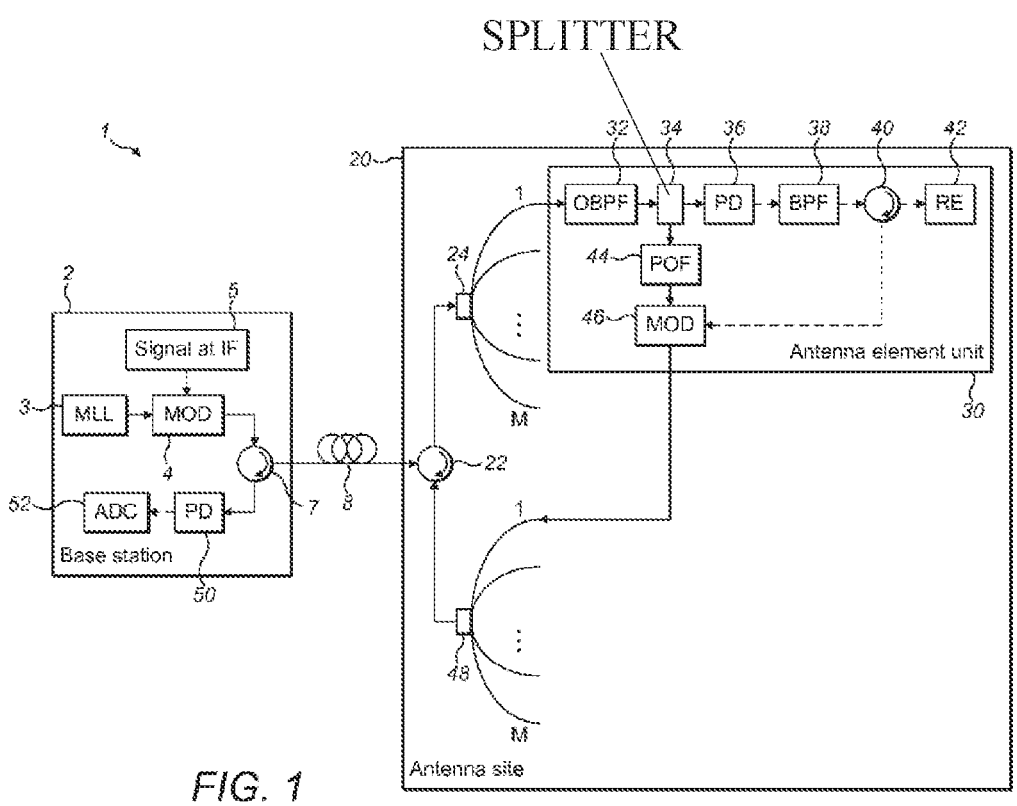
FIG. 1 is schematic illustration of a first example of a transceiver according to an example of the invention.

FIG. 1 shows a schematic functional diagram of a transceiver 1 for a phased array antenna according an example of the invention. The transceiver 1 is configured to generate signals for a phase array antenna, e.g. to be transmitted by the phase array antenna. The transceiver 1 is also configured to receive signals from a phase array antenna.

The transceiver 1 is distributed over a base station 2 and an antenna station 20. The base station 2 and antenna station 20 (or antenna site) are connected by one or more optical fibres 8, as described. The base station and antenna station of any example may be integrated, co-located, or may be spaced apart.

The transceiver 1 comprises a laser light source, for example, in the form of a mode-locked laser (MLL) 2. The mode-locked laser 2 is configured to generate a plurality of discrete wavelengths, corresponding to longitudinal modes of the laser. The modes are separated by a repetition wavelength or frequency. For example, the laser source is a fiber laser, e.g. a fiber mode-locked laser. In some aspects, the laser source of the transceiver is the single mode-locked laser only, avoiding a need for multiple lasers or a tunable laser. The MLL is used as a multi-wavelength source. The repetition rate of the MLL is $f_{RR}$.

The wavelengths of the mode-locked laser 2 are modulated with a modulator 4. The modulator 4 is an electro-optic modulator. Any type of modulator may be used, e.g. a ring resonator or Mach-Zehnder modulator.

The modulator 4 applies a modulation to the optical signal at one or more frequencies. The modulating signal is from a signal source 5. The one or more frequencies of the signal source 5 are at an Intermediate Frequency (IF), rather than an RF modulation. In the example shown, a single modulation is applied to provide for a corresponding single modulated RF signal. In some examples, the IF signals applied contains data to be transmitted. For example, an IF signal is modulated with a baseband data signal, prior to modulating the optical spectrum of the MLL. In some examples, the entire optical spectrum of the MLL is modulated in the optical modulator. The modulating signal may be digitally generated at a low frequency (intermediate frequency), $f_{IF}$.

In some aspects, the modulation by the modulator 4 is a baseband signal, i.e. not at an Intermediate Frequency.

The modulated optical spectrum is sent to the antenna station through a first optical circulator 7 at the base station. The first optical circulator 7 is connected to a feeding fiber 8, through which the modulated optical spectrum is sent to the antenna station 20.

The fiber 8 has a chromatic dispersion. The fiber 8 may be considered as an example of a dispersion unit configured to introduce a time delay to the optical signal. The dispersion unit is a dispersive element, and may be termed an optical dispersion unit or optical delay unit. The time delay introduced is dependent on the wavelength of the optical signal.

The fiber 8 may be considered as a dispersion compensating fiber (DCF). The dispersion compensating fiber 8 introduces a delay to the optical signal by an amount of time dependent on the wavelength of each optical signal. The fiber is configured to introduce chromatic dispersion. In particular, the fiber used to bring the signal to the antenna induces chromatic dispersion on all the wavelengths of the optical signal. In some examples, the DCF has a length which provides for the laser source 2 and/or modulator 4 to be remote from a phase array antenna (described below). In some examples, the dispersion unit 8 is common for all elements of the PAA.

The dispersion compensating fiber 8 is common for all the optical wavelengths. Thus, the same dispersion unit 8 is used for generating all the RF signals. In some aspects, the dispersion compensating fiber is a single fiber arranged to introduce a time delay to the optical signal which is dependent on the wavelength. The chromatic dispersion is applied after the MLL output is modulated.

In some examples, the dispersion compensating fiber 8 can be integrated with the modulator 2. For example, the modulator 2 is a ring resonator coupled to a single waveguide.

The tem spectral component refers to the plurality of laser modes and any associated wavelengths resulting from modulation. The term 'spectral component' will be used to refer to any component of the optical spectrum which is carried by the dispersion unit or other part of the transceiver, and subsequently processed as described. The plurality of laser modes and any wavelengths resulting from modulation may be considered as associated with the wavelengths from the laser source. Thus, a spectral component is any spectral component derived from the laser source wavelengths (including the laser source wavelengths themselves without modulation). The spectral components are derived directly from the laser source or from an applied IF signal and/or modulation of the laser source.

Each spectral component is associated with a wavelength (e.g. MLL mode) directly generated by the laser source For example, the spectral component is a wavelength generated by the laser light source, e.g. generated directly by the laser light source. The spectral component is the wavelength of the mode generated by the mode-locked laser.

At the antenna station 20, a second optical circulator 22 is connected to the fiber 8, and receives the spectral components. The second optical circulator is configured to send the optical signals to a splitter 24. The splitter 24 is configured to distribute the optical signals to each of a plurality of antenna element units 30. Each antenna element unit 30 comprises components for processing the signal associated with an element of the antenna. The transceiver comprises a plurality of antenna element units 30, connected to a plurality of elements of the antenna.

An example arrangement of an antenna element unit 30 is now described. Each antenna element unit 30 has the same arrangement. Each antenna element unit comprises a first filter 32. The first filter 32 is configured to select a plurality of laser modes, including the associated wavelengths resulting from modulation of the laser modes.

In some examples, the first filter 32 selects spectral components associated with at least two spaced wavelengths, i.e. at different frequencies. The selected spaced wavelengths include spectral components associated with two (or more) modes from the MLL. The selected spectral components may comprise the wavelengths resulting from modulation of the laser modes. In some examples, the first filter 32 selects more than two such laser modes. The selection of more than two laser modes, including the associated wavelengths resulting from modulation of the laser modes, provides for generating a plurality of RF signals of different frequency. The first filter 32 selects the desired pairs of modes from the MLL spectrum.

In some aspects, the first filter 32 is a tunable filter. The tunable first filter 32 is configured to select a variable pass band of the optical signal. The tunable first filter 32 is configured to vary a lower limit of the passband and/or a higher limit of the passband. Thus, the first filter 32 is configured to determine from which part of the optical spectrum the spectral components are passed. The first filter 32 comprises one or more passbands. Each passband comprises one or more spectral components. The selected spectral components are associated with adjacent or non-adjacent spaced wavelengths (e.g. adjacent or non-adjacent modes). The first optical filter is configured to select at least one pair of spaced wavelengths each having at least one associated spectral component for generating the signal for transmission by the phased array antenna.

The first filter 32 is controlled to select spectral components according to the frequency of the RF signal selected and the delay which is required. For example, the spectral component are selected according to the spaced wavelengths (modes) with which the spectral components are associated. The selection of the spaced wavelengths (e.g. modes) substantially determines the frequency of the RF signal and the time delay from the dispersion unit. In the example shown, the first filter 10 comprises a single output of all the wavelengths selected. In some examples, the first filter 32 is a tunable optical bandpass filter (OBPF). The bandwidth of the first filter 32 must be at least as wide as the maximum frequency to be generated.

By tuning the first filter 32, the time delay of the RF signal is controlled via the undergone chromatic dispersion of the feeding fiber 8. By controlling the time delay in each antenna element, the transmitter beamforming can be realized. The first filter 32 receives a plurality of pairs of spectral components from a single source. The first filter 32 is configured to select one or more pairs, a subset of the received spectral components, for heterodyning to generate the RF signal. All the received spectral components have undergone chromatic dispersion, e.g. in the fiber 8. All the received spectral components originated in the base station, e.g. from the same laser source, for example, MLL 3.

After the first filter 32, a splitter 34 divides the selected portion of the spectrum, for additional use in the receive beamforming. The splitter 34 selects a same portion of spectrum as for the transmission part. The splitter 34 receives only the spectral components selected by the first filter 32 for use in transmission beamforming. As such, the splitter 34 distributes the same portion of spectrum for receive beamforming as used for the transmission part. The receive beamforming is described in more detail below.

The splitter is configured to divide the selected optical signals into an optical signal for use in transmission of RF signals and an optical signal for use in receiving RF signals. For transmission, the optical signal filtered (i.e. selected) by the first filter 32 is passed from the splitter 34 to a first heterodyning device 36. The first heterodyning device 36 is configured for optical heterodyne detection. In some examples, the optical heterodyning device 36 is one or more photodiode. The spectral components of the optical signal are mixed by impinging together on the surface of the photodiode.

The first optical heterodyning device 36 is configured to output a spectrum including the difference or beatings between pairs of optical spectral components. The difference in wavelengths brings the signal from the optical domain into the RF domain. Thus, an output of the device 36 comprises radio frequency signals. The radio frequency signals contain the modulation included from the modulator 4. The photodiode 36 generates the beatings between all the signal components selected by the first filter 32. Among these beatings, the desired RF signal at $f_C=Nf_{RR}+f_{IF}$ (or at $f_C=Nf_{RR}-f_{IF}$), with N a positive integer, is generated. The RF frequency is derived from a difference in the selected spectral components, and not from any addition of a RF signal to a spectral component.

A second filter 38 is configured to select one or more frequency to be passed to the phased array antenna. In particular, the second filter 38 is an electrical filter. The second filter 38 filters at radio frequency. The second filter 38 is configured to select one or more RF frequency, i.e. has one or more passband. In some cases, one passband is configured to pass one frequency from the RF spectrum. In some implementations, the second filter 38 comprises a plurality of distinct passbands to select a plurality of frequencies. The second filter 38 is an RF bandpass filter (BPF) passband filter. The transceiver comprises one or more radio frequency, RF, filter arranged to receive an RF signal from the heterodyning device and select one or more RF signals for transmission by the phased array antenna.

In some examples, the one or more selected frequency is from a mix of a laser mode wavelength without modulation and a modulated (or IF modified) laser mode wavelength. The combined spectral components are associated with different spaced wavelengths or laser modes. For example, a laser mode wavelength without modulation is mixed with a modulated wavelength associated with a different laser mode. The different laser mode may be an adjacent laser mode, or a non-adjacent laser mode, i.e. separated by one or more intermediate modes. The laser light source comprises a mode-locked laser configured to provide the optical spectrum having the plurality of spaced wavelengths, wherein the spaced wavelengths correspond to laser modes, and the heterodyning device is configured to heterodyne spectral components associated with different modes.

The output of the second filter 38 is sent to an RF circulator 40. The RF circulator 40 is configured to pass RF signals for transmission from the second filter 38 to a radiating element (RE). An array of REs forms the phased array antenna.

The transceiver 1 is connected to a phased array antenna (not shown) comprising a plurality of radiating elements or phased array antenna elements. The radiating elements are arranged in an array of any format, for example, in two-dimensions, or in one or three dimensions.

The functions and components of the antenna element unit 20 in reception of RF signals is now described.

As mentioned above, the splitter 34 is configured to provide a copy of the selected portion of optical spectrum for use in receiving RF signals. The optical signal filtered (i.e. selected) by the first filter 32 is passed from the splitter 34 to a third filter 44. The third filter 44 is configured to select only the spectral components which are not modulated by the modulator 4. Such spectral components correspond to the MLL modes only. The modes used for receiving RF signals are those modes (and their associated spectral components) selected by the first filter 32 for transmission. The splitter is configured to split spaced wavelengths of the optical spectrum used for transmission, wherein the splitter is configured to provide the split spaced wavelengths for receiving signals from the phased array antenna. The splitter is downstream of the first optical filter configured to select a frequency range of spectral components to be used for transmission.

In some examples, the third filter 44 is a periodic optical filter (POF). A period of the POF is equal to the MLL repetition rate, $f_{RR}$. The POF is tuned to exactly select the original modes from the MLL. The third filter is configured to discard the modulation sidebands (e.g. spaced by IF from the MLL modes). The third filter 44 may be considered as a second optical filter, configured to select only the spaced wavelengths corresponding with the spectral components used for transmission.

The antenna element unit 30 further comprises an optical modulator 46. The optical modulator 46 is passed received RF signals from the RE 42 through the RF circulator 40. The optical modulator 46 is configured to modulate the optical output of the third filter 44. As such, the optical modulator 46 is configured to modulate the original laser modes with the RF signal detected by the radiating element. The wavelengths which are modulated are the same wavelengths, and from the same source, as the wavelengths and their associated spectral components are used for transmission.

The optical modulator 46 from each antenna element unit 30 outputs the original modes modulated by the received RF signals at every antenna element. These outputs are coupled together in a coupler 48.

In some examples, the coupled modes modulated by the received RF signals optical are sent back to the base station 2 through a dispersion unit as spectral components. The dispersion unit used for receiving has the same chromatic dispersion characteristics as the dispersion unit 8 used in transmission. In one example, the dispersion unit is an optical fiber. The dispersion unit may be the same (i.e. same fiber 8) or different (i.e. different fibers) for transmission and receive. The transceiver is configured to introduce a delay to the plurality of spaced wavelengths modulated with the received signals, wherein the delay is dependent on the wavelength of the spectral components of the optical spectrum.

The chromatic dispersion of the feeding fiber 8 delays the different modes according to their wavelength, implementing the receive beamforming. Since the same wavelengths are used for transmission and reception, as selected by the first filter 32, dispersion delay is the same in transmission and reception. The beamforming characteristics are therefore the same in transmission and receive.

In some aspects, the spectral components used for receive beamforming are the same as those used in transmission beamforming, i.e. associated with the same MLL modes. The spectral components for both receive and transmission beamforming are from a single laser source. The single laser source is at a single location. The location is separated from the antenna element units by the dispersion unit (fiber 8). The single laser source provides all of the wavelengths for transmission and receive beamforming in the transceiver. For the same dispersion characteristics in receive as in transmit, the receive beamforming is configured to receive an RF signal from the same direction as transmitted by the transmission beamforming. The transceiver is configured to introduce a delay to the plurality of spaced wavelengths modulated with the received signal with the same chromatic dispersion characteristics of the dispersion unit used in transmission.

The receive modulated spectral components are received in the base station by the optical circulator 7, which passes the modulated spectral components to a second heterodyning device 50. The second heterodyning device 50 is configured for optical heterodyne detection, in particular, for optical heterodyne detection. The second heterodyning device 50 (photodiode) operates similarly to the first heterodyning device 36 (photodiode). In some examples, the optical heterodyning device 50 is one or more photodiode. The spectral components of the optical signal are mixed by impinging together on the surface of the photodiode. The optical heterodyning device 50 is configured to output a spectrum including the difference or beatings between pairs of optical spectral components. The difference in wavelengths brings the signal from the optical domain into an IF domain or baseband domain. The second heterodyning device is configured to output a signal downconverted from the received signal.

In some examples, the spectral components which are selected using the second heterodyning device 50 (photodiode) for receiving are the same as selected for transmission. In some examples, the spectral components heterodyned together are associated with different modes of the MLL.

In some examples, the receive RF signal is downconverted to intermediate frequency or baseband. This is done by a selection of spectral components associated with MLL modes which differ by the RF frequency. This is the reverse of the generation of the RF frequency in the antenna element unit by selection of spectral components associated with different MLL modes to be used as the output. In some examples, an output from the heterodyning is from a spectral component modulated with the receive RF signal and an unmodulated spectral component. These spectral components heterodyne to produce a baseband or intermediate frequency, depending on whether the receive RF signal was modulated in transmission by baseband or IF signal respectively.

Although the spectral components for which heterodyning product is selected originated from different spectral components, e.g. associated with different modes of the MLL, the RF modulation provides that the selected spectral components have frequencies which are separated by the IF frequency, or not separated in frequency for baseband modulation. This provides for downconverting. This downconverting is achieved using only the spectral components received from the antenna element unit 30. In some aspects, the heterodyning removes the RF component of the received signal, leaving only the IF or baseband modulation.

In transmission, the selected two spaced wavelengths are separated by an RF frequency, such that on heterodyning an RF frequency is generated for the first time. In receive, one of the two spaced wavelengths is modulated by a RF frequency. This shifts the wavelengths such it is at substantially the same wavelength as the other of the spaced wavelength. In this case, substantially the same wavelength includes wavelengths separated by an IF, but not separated by a RF frequency used for transmission from, or receiving at, the antenna. The heterodyning results in the downconversion. In some examples, the spaced wavelengths carrying the modulation are the same, i.e. same two modes of the MLL are used by a particular antenna element unit in transmission and receive. The different frequencies of spectral components used by the different antenna element units provides for beamforming in reception. The spectral components which are heterodyned may comprise one modulated spectral component and one unmodulated spectral component, or two modulated spectral component.

Each portion of the spectrum is detected by the heterodyning device 50, which generates the beatings between all the spectral components in the portion. Among these beatings, the desired downconverted signal is at $f_{IF}$. Each portion therefore generates a signal at $f_{IF}$, each one with a delay depending on the beamforming. All the signals at the same frequency (e.g. $f_{IF}$) then sum together, generating the modulation seen by the PAA.

An output of the heterodyning device 50 is converted to a digital form using an electronic analogue-to-digital converter (ADC) 52. One or more further filters (not shown) may be located between the heterodyning device 50 and ADC 52. In some examples, the electronic analog-to-digital converter (ADC) samples the downconverted signal at $f_{IF}$. The digital signal may then be digitally processed.

The transceiver comprises only one heterodyning device 50 and ADC 52 to receive the RF signals from all of the antenna elements. The receive beamforming is carried out optically and centrally, instead of at a RF frequency separately for each antenna element.

In the described architecture, the portions selected by the first filters 32 (OBPFs) in every antenna element must be spectrally disjoint. Moreover, a guard band must be respected between the selected portions, greater than the bandwidth of the ADC.

The functionality of the transceiver 1 ensures the beamforming in transmission and reception is exactly equal. The transceiver 1 uses the same dispersive fiber and the same wavelengths for both transmission and reception at each antenna element. The same optical fiber is configured to carry modulated optical spectral components in transmission and modulated optical spectral components in receive. This provides for the transmitted and received signals at each RE to undergo the same time delay. This provides that both the transmitted and received RF beams are steered at the same angle.

In some aspects, the transceiver 1 operates to form a transmission beam, using the first filters 32 for a plurality of radiating elements each configured to select different wavelengths to be heterodyned. This provides for different RF signals (e.g. different time delays) for a plurality of the radiating elements. The frequency of the RF signals is the same within the beam, although the spectral components from which the RF signals are derived differ between the radiating elements. Since the dispersive fiber 8 introduces a delay based on the wavelength of the optical signal, selection of the optical wavelengths to form the RF signals allows a selection of the delay, for a particular frequency of RF signal. The dispersive fiber 8 is arranged to introduce a true time delay to spectral components which do not yet comprise a RF component. Thus, the true time delay is introduced onto an optical signal which does not contain an RF signal.

The delay at the radiating element is determined by a selection of which spectral components are heterodyned (i.e. by tuning of the first filter) and/or passed to the radiating element (i.e. by tuning of the second filter). The delay for a particular radiating element (PAA element), or the RF frequency for transmission, is not determined in the base station.

In particular, the base station does not select a particular optical frequency to carry the data on the dispersive fiber, or include a RF frequency for transmission on a spectral component. Instead, the base station transmits a plurality of optical spectral components, e.g. from a MLL, carrying the data for transmission.

The antenna station 20 (antenna element unit 30) has flexibility to select from the fixed received spectral components the RF frequency to be selected, by selecting two spectral components with a required RF frequency difference. The antenna station 20 (antenna element unit 30) also has flexibility to select from the fixed received spectral components the delay of the RF signal for beamforming, by selecting the absolute frequency of spectral components used to generate the RF transmission. The RF signal at each radiating element is independent.

The transceiver 1 is configured to generate RF signals for the PAA with the required delay for true time delay beamforming. The transceiver 1 both optically generates the RF signals and optically introduces the time delay. The IF signal is also introduced to an optical signal. The RF signal for the phased array antenna is first generated by the heterodyne device.

Each element of the antenna is fed by a pair of modes from the mode locked laser for each of the RF signals to be transmitted. The stability of the mode locked laser guarantees the high quality of the generated RF signals. The mode-locked laser is used to optically generate highly stable RF carriers by heterodyning its phase-locked modes in a photodiode. To generate modulated signals instead of simple continuous waves, the MLL spectrum is optionally modulated by the signal at intermediate frequency (IF). The delay of each RF signal at each antenna element is defined by the wavelength of the mode pair, through the chromatic dispersion of the feeding fiber. The large number of modes available from the mode locked laser allows generation of multiple independent RF signals in large phased array antennas.

Since the RF signal frequency is determined by the relative frequency detuning of the selected modes, the same signal can be generated by selecting laser modes in different positions of the optical spectrum. If the optical spectrum undergoes chromatic dispersion, the spectral components experience different delays depending on their wavelength. Thus, the same frequency RF carrier can reach the antenna with different delays according to the absolute wavelengths of the selected mode pair. The delay $\Delta t$ induced by changing the filter position is given by:

$$\Delta t = D \cdot \Delta \lambda$$

where D is the value of the chromatic dispersion and $\Delta \lambda$ the wavelength difference of the selected mode pairs. The delay induced on the RF signal is independent of its carrier frequency and bandwidth.

Each pair of modes is delayed differently by introducing chromatic dispersion. The delay of the signals at each antenna element is controlled by choosing the appropriate mode pair. The mode pair is selected according to its wavelength to achieve the required delay for an antenna element, even though the mode pair does not contain an RF modulation. The mode pairs include both the time delay and particular wavelengths to be heterodyned to an RF signal. The wavelengths of the mode pairs determine the time delay, and the separation of the mode pairs determine the frequency of the RF signal transmitted by the antenna element. References to mode pairs here include spectral components associated with mode pairs, i.e. components generated by modulating a mode of the mode pair. The heterodyned components in transmission and reception are, or are associated with, different laser modes. As such, the heterodyned components passed to the antenna element (or base station in reception) may be considered as a mode pair.

The modulation of the RF signal is introduced on the optical signal. The mixing of the optical signals provides an RF signal containing the modulation. In some examples, the modulated RF signal is selected, e.g. by a filter, to be provided to the elements of the PAA. The modulation is introduced prior to the time delay (e.g. by dispersion). The modulation is also introduced to the optical signal as a separate step to the generation of the RF signal. The modulation is introduced prior to the RF signal.

In some aspects, the IF signal has a tunable or variable frequency. The tunable frequency of the IF signal allows the RF signal generated to be varied. Thus, the RF signals which can be generated are not limited to the difference between two fixed frequencies (i.e. fixed mode frequency and/or fixed IF frequency). In some examples, the IF signal is variable over a range which is equal to or greater than the spacing between the wavelengths from the laser light source, e.g. mode spacing. This allows the RF signal to be generated at any frequency, e.g. with the appropriate combination of IF frequency spacing and number of mode spacings. The IF signal may or may not be modulated.

In an example of the present invention, the laser source 2 is a fiber MLL. For example, the MLL has a repetition rate of 9953 MHz, having modes with a full width half maximum (FWHM) of about 0.7 nm. In one example, the MLL modes extend at least between 194.165 THz and 194.265 THz. The dispersion compensating fiber 8 has a total accumulated chromatic dispersion of −160 ps/nm. The first filter is configured to operate as a single 50 GHz-bandwidth band-pass filter. In this case, the first filter is configured to select five adjacent lines of the MLL. The optical signal is detected by a 40 GHz-bandwidth photodiode. The PD generates an RF signal made of components at approximately 10, 20, 30, and 40 GHz. The PD output is split into two paths, and two electrical bandpass filters centered at 9953 MHz and 39812 MHz isolate the spectral components. In some examples, the first filter may vary in 10 GHz steps between PAA elements in order to select different groups of modes.

In some examples, the IF signal has a frequency which is less than the repetition frequency between spaced wavelengths. In some examples, the IF signal carrying modulation has a frequency which provides for separation of the IF spectral component from a laser mode frequency. In some examples, the IF signal carries a modulating signal of bandwidth B. For a double sideband modulation, the IF is in the range between (B/2) and ($f_{RR}$/2−B/2). For a single sideband modulation, the IF is in the range between (B/2) and ($f_{RR}$−B/2).

Figure 2:
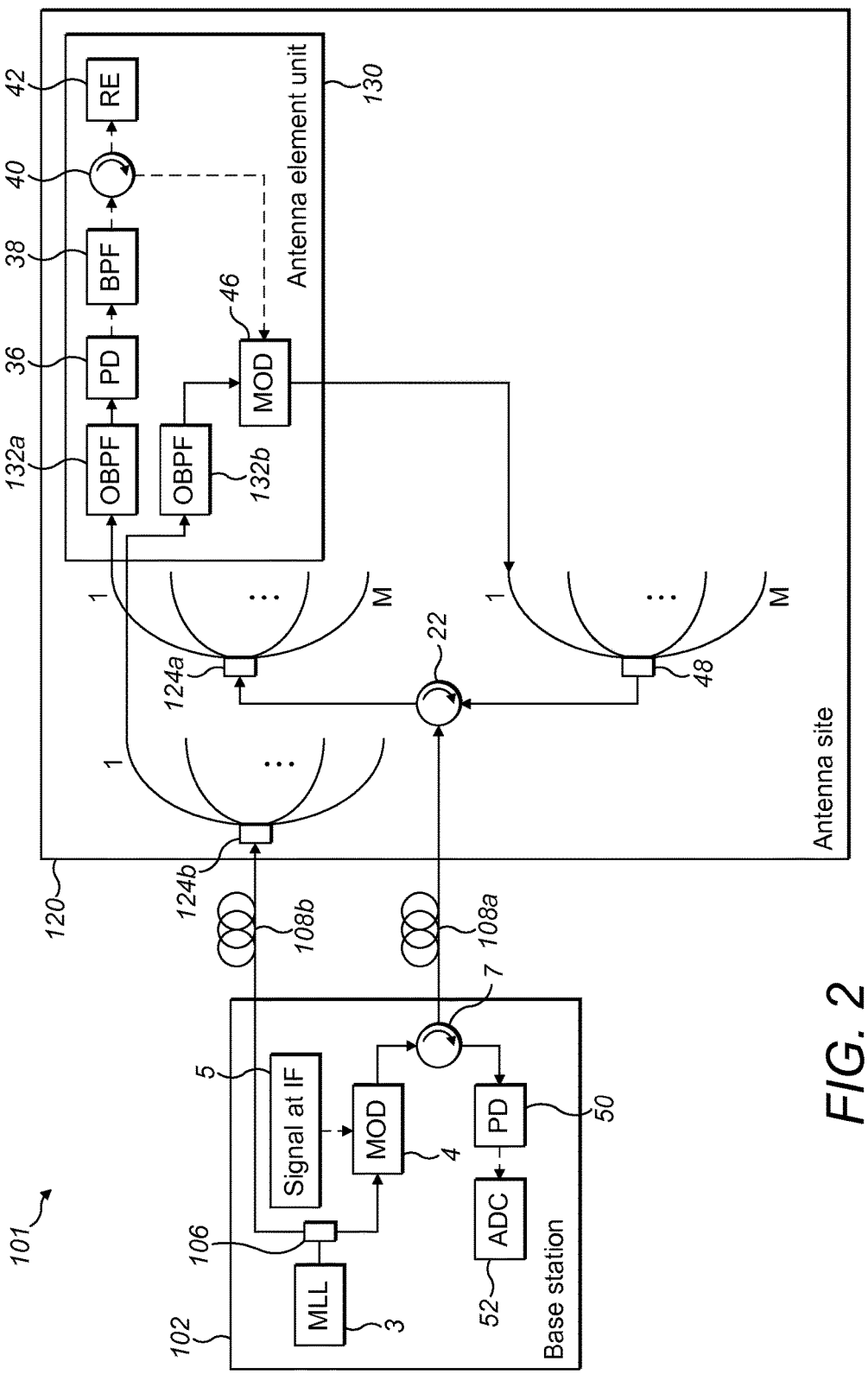
FIG. 2 is schematic illustration of a second example of a transceiver according to an example of the invention.

FIG. 2 shows an alternative embodiment of transceiver 101. The transceiver 101 is configured to generate a transmission RF beam and carry out receive beamforming, as described with respect to FIG. 1. The overall structure and functions of the components are as described with respect to FIG. 1, unless otherwise described.

The transceiver 101 differs from the transceiver 1 in the arrangement of providing the spectral components to the antenna element unit, to provide for the receive beamforming. In the transceiver 101, base station 102 comprises a splitter 106 at the output of the laser source 3. The splitter 106 is configured to distribute part of the optical power to the modulator 4, for modulation as described above for transmission beamforming. The modulated spectral components are transmitted to the antenna station 120 through a first optical fiber 108a, having dispersive characteristics as described above for the optical fiber 8. The splitter is configured to split spaced wavelengths of the optical spectrum used for transmission, wherein the splitter is configured to provide the split spaced wavelengths for receiving signals from the phased array antenna. The splitter is upstream of a modulator configured to modulate the optical spectrum for transmission.

The splitter 106 is also configured to distribute part of the optical power separately to the antenna station, for use in the receive beamforming. An output of the splitter 106 is connected to a second optical fiber 108b, to transmit the laser wavelengths to the antenna station 120. The transmitted MLL modes are not modulated. The second optical fiber 108b provides for a transmission of optical wavelengths separately from the first optical fiber 108a.

Substantially as described above, the modulated spectral components are received from the first optical fiber 108a, and through optical circulator 22 are distributed by a first splitter 124a to each of the plurality of antenna element units 130. The modulated spectral components are transmitted to a transmission first filter 132a (e.g. an optical band pass filter), corresponding to the first filter 32 described above.

The antenna station 120 receives the transmitted spectral components from the second optical fiber 108b at a second splitter 124b. The second splitter 124b is configured to distribute the spectral components to each of the plurality of antenna element units 130. As such, the antenna element units 130 separately receive from a single source both the spectral components for generating the transmission RF signal, and spectral components for receive beamforming. All the spectral components are from the same source, which in this example is in the base station.

The spectral components from the second splitter 124b are transmitted to a receive first filter 132b (e.g. an optical band pass filter). This receive first filter 132b has the same functionality as the first filter 32 described above. The receive first filter 132b is configured to select the same portion (i.e. frequency range) of optical spectrum as for the transmission first filter 132a. This provides for the same optical component frequencies being used in transmission and receive beamforming, generating RF signals and down-converting RF signals respectively.

The receive first filter 132b provides the copy of the optical components (e.g. MLL modes) to the modulator 46, which modulates the optical components with the received RF signal from the RE 42, as described above. Also as described above, the receive modulated optical components are transmitted via coupler 48, optical circulator 22 and first fiber 108a back to the base station for receive heterodyning to extract the IF or baseband modulation of the RF signal. The transceiver comprises a second optical filter (receive first filter 132b) configured to select spaced wavelengths of the laser light source with a same frequency range of optical spectrum as the first optical filter (transmission first filter 132a).

This embodiment does not require a third filter (periodic optical filter) to provide optical components to carry the receive RF signal. Instead, a separate feed of spectral components without modulation, e.g. the MLL modes, is provided separately from the same source which also generates spectral components for modulation in transmission. The functions of the optical wavelengths in receive beamforming, using the dispersive fiber 108a to introduce a time delay, and using heterodyning of optical components relating to different modes to downconvert from RF to IF or baseband, as described in other examples.

Figure 3:
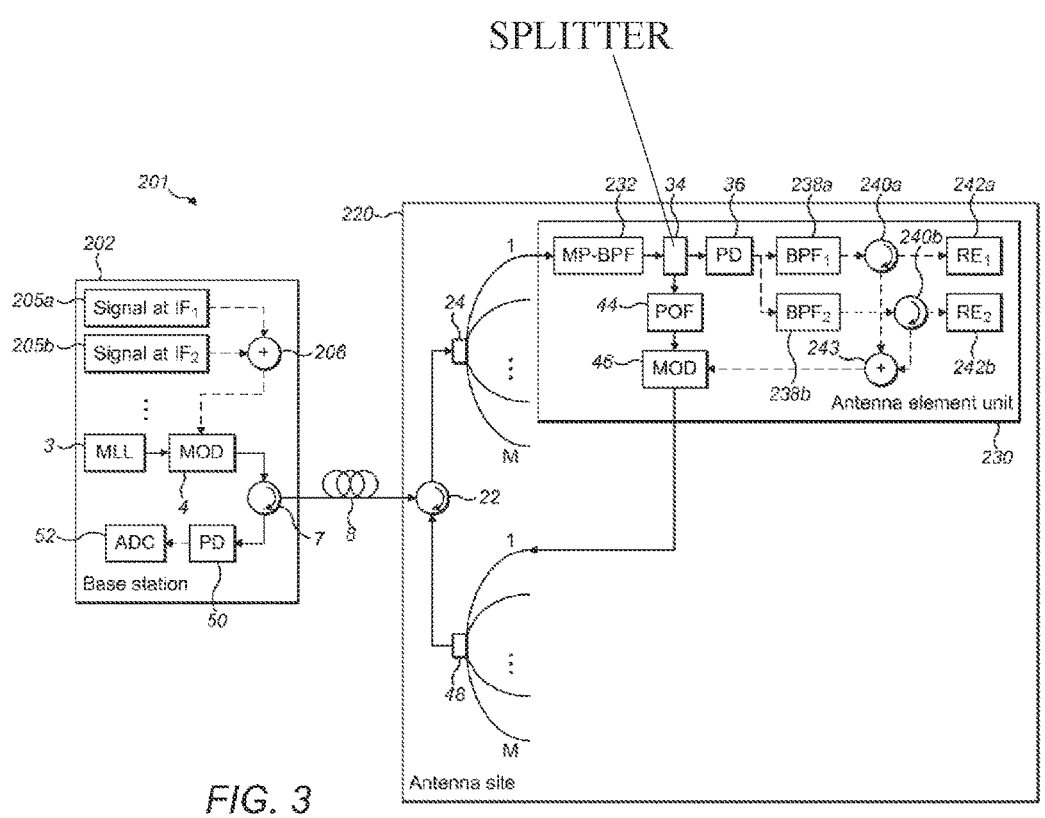
FIG. 3 is schematic illustration of a third example of a transceiver according to an example of the invention.

FIG. 3 shows an alternative embodiment of transceiver 201. The transceiver 201 is configured to generate a transmission RF beam and carry out receive beamforming, as described with respect to FIG. 1 or 2. The overall structure and functions of the components are as described with respect to FIG. 1, unless otherwise described. Alternatively, the additional features described may be implemented with the features described for the transceiver 101 of FIG. 2.

This embodiment provides for transmission and receiving of a plurality of independent RF signals. Base station 202 comprises a plurality of signal sources 205a,205b for transmission. The signal sources 205a,205b provide signals at different intermediate frequencies. In this example, the base station 202 comprises two signal sources 205a,205b; further signal sources and corresponding components in the transceiver 201 may be included to provide for transmission and receiving additional RF signals.

The signals from the plurality of signal sources 205a,205b are combined or multiplexed in a combiner 206. The plurality of signal sources 205a,205b are then provided to the modulator 4, for modulation of all the plurality of spectral components, e.g. from the MLL 3. This provides for all the plurality of signal sources 205a,205b to independently modulate the plurality of spectral components. The optical signal from the MLL is modulated by the sum of multiple signals at different IF.

As described for the transceiver 1, the modulated spectral components are transmitted to the antenna element units via the first optical circulator 7, dispersive fiber 8, second optical circulator 22 and splitter 24.

The modulated spectral components are received in a first filter 232. The first filter 232 is a multi-pair bandpass filter (MP-BPF) 232. The MP-BPF 232 is an optical filter configured to select (i.e. pass) a plurality of frequency portions of the optical spectrum. This allows for a two optical components to be selected for each RF signal to be generated. The first filter 232 is tunable. The first filter 232 is configured to select multiple portions of the spectrum, so that the multiple RF signals can be steered independently.

In each antenna element unit 230, a heterodyning device 36 is at the output of the MP-BPF 232. For example, the heterodyning device 36 is a photodiode as described above. The heterodyning device 36 is configured to generate a plurality of beatings. These beatings are passed to a second filter having a plurality of passbands.

The first optical filter is configured to select a first pair of spaced spectral components for generating a first frequency signal for transmission by the phase array antenna, and in this example, a second pair of spaced spectral components for generating a second frequency signal for transmission by the phase array antenna.

In some aspects, the second filter comprises a plurality of filters, each having a passband. In the example shown, the second filter comprises two filters 238a,238b, each defining a passband. The second filters 238a,238b are RF filters. The second filters 238a,238b are configured to separate the multiple desired signals. Each of the second filters 238a, 238b selects one RF signal for transmission. Each RF signal contains a signal from one of the signal sources 205a,205b. The selected RF signals are each separately sent to separate optical RF circulators 240a,240b. The selected RF signals are each separately sent to specific radiating elements 242a, 242b. The radiating elements 242a,242b are arranged in separate sets, forming separate antennas for each signal.

After the detection in the PD 36, the desired beating at a multiple of the MLL repetition rate shifted by IF is selected with the RF second filter 238a,238b. By properly choosing the IF and the signal bandwidth, more than one modulating signal can be applied. If more than a pair of modes are correctly filtered, more than one RF signal can be simultaneously generated at different carrier frequencies in a single PD 36. Thus, one or more RF signal is generated for the attached element(s) of the antenna. For each element, the RF signals may have a different frequency, time delay and/or modulation.

For reception, the RF signals from the plurality of sets of radiating elements 242a,242b in each antenna element unit 230 are summed together in a combiner 243. The summed RF signals are transmitted to a modulator 46. The modulator 46 also receives the original unmodulated optical components from the light source, e.g. from a periodic optical filter as described with respect to FIG. 1. Alternatively, the modulator 46 may receive the unmodulated optical components from the light source according to the separate feed described with respect to FIG. 2. The modulator 46 is configured to modulate the original laser modes with all of the signals received.

The receive modulated optical components are transmitted to the base station through coupler 48, optical circulator 22, dispersive fiber 8 and optical circulator 7, as described above.

The heterodyning device 50 is configured to downconvert the received signals, substantially as described. In this embodiment, the received signals are downconverted to their original intermediate frequency. As such, the heterodyning device 50 outputs a plurality of signals at different intermediate frequencies. The downconverted signal is at a frequency lower than a frequency received by the antenna. As such, the spectral components selected for heterodyning have effectively removed RF frequency signal carrying the modulation as transmitted and received by the antenna. This corresponds to the use of spectral components in transmission selected to generate (and not merely recover) a RF frequency signal for the first time in the transceiver.

The ADC 52 is configured to digitize the downconverted signals at their original $f_{IF}$.

In some aspects, the use of modulation at an IF allows a plurality of modulations to be used with the same or separate PAA. A different frequency of IF is used for each modulation signal. The different frequencies of IF may be selected as described, e.g. with the second filter 238a,238b. In some examples, the different frequencies of IF may be selected for the PAA independently of the frequency of the RF signal on which the modulation is carried. This allows a plurality of modulation signals for the PAA at the required RF frequencies.

FIGS. 4a to 4c show example optical and RF components at different points in the transceiver. This example shows two signals at different IF, corresponding to the embodiment of FIG. 3. The example is still applicable to the embodiments of FIGS. 1 and 2, by considering only one of the IF signals.

FIG. 4a shows an exemplary spectrum 430 of the optical signal, at an output of the modulator 4. The spectrum 430 includes the plurality of wavelengths 431 of the laser source, e.g. corresponding to the laser modes. The modes 431 are examples of spaced wavelengths, e.g. separated by the repetition frequency ($f_{RR}$). The optical signal also includes the mode wavelengths modulated by the one or more IF signal. In some examples, the modulation results in further wavelengths at $f_{RR} \pm f_{IF1}$ 432 and $f_{RR} \pm f_{IF2}$ 433. The optical signal comprises repeating mode wavelengths 431, and further associated modulation wavelengths 432,433. In one example, the modulation is with 1 ns-long pulses (1 GHz modulation bandwidth). Any type of modulation may be applied, for example, on-off keying or phase modulation.

For example, spectral components 431,432,433 of the optical spectrum are associated with a particular one of the spaced wavelengths (e.g. one of the laser modes). A spectral component which is modulated but does not have a separate modulation sideband may also be considered as associated with that laser mode. In any example, the original unmodulated spaced wavelength may or may not be present with the modulated spectral components.

FIG. 4b shows an example optical spectrum 440 at an output of the first filter 32;132;232. The optical spectrum 440 has been filtered by the first filter 32;132;232, for example with one or more passbands 441,442,443,444. One or more of these example passbands comprises a plurality of wavelengths, for example, including different ones of the spectral components (e.g. modes) and the spectral components for both the original wavelength and the further associated (e.g. modulated or IF modified) wavelength.

In some examples, the passband of the first filter includes in the passband 441 all of the spaced wavelengths (e.g. modes) between the lowest and highest wavelength spaced wavelength pair required. Alternatively, the first filter 32;132;232 selects only the pairs which are required. In particular, for selected non-adjacent pairs of spaced wavelengths (e.g. modes), at least one intermediate spaced wavelength (e.g. mode) is not selected by the first filter, as shown by passbands 42,43.

FIG. 4c shows an RF spectrum 450 output by the photodiode 36, with the wavelengths selected by the second filters 38;238a,238b. Example frequencies in the spectrum 450 include the repetition frequency $f_{RR}$ 451, from the beating between adjacent laser modes. A further frequency $Nf_{RR}$ 452 is derived from a pair of laser modes separated by N repetition frequencies. The frequency $Nf_{RR}$ is derived from non-adjacent laser modes, i.e. separated by one or more laser modes. The beatings used to generate the RF signal are from adjacent or non-adjacent spectral components from the laser source, e.g. MLL.

In this example, the second filter 238a selects a frequency $f_{RR}-f_{IF1}$ 453 derived from wavelengths associated with a pair of frequency adjacent laser modes. The second filter 238b selects a further selected frequency $Nf_{RR}+f_{IF2}$ 454 which is derived from wavelengths associated with a pair of laser modes separated by N repetition frequencies. In this case, the plurality of selected RF signals have different modulations, frequency and time delay. Further frequencies generated by the heterodyne mixing, are filtered out by the second filter.

In some examples, the unmodulated RF signals are also filtered out. Alternatively, unmodulated RF signals are selected by the second filter, e.g. if there is no modulation or a signal without modulation is to be transmitted. Alternatively, RF signals are selected from a mixing of two modulated spectral components.

Figure 5:
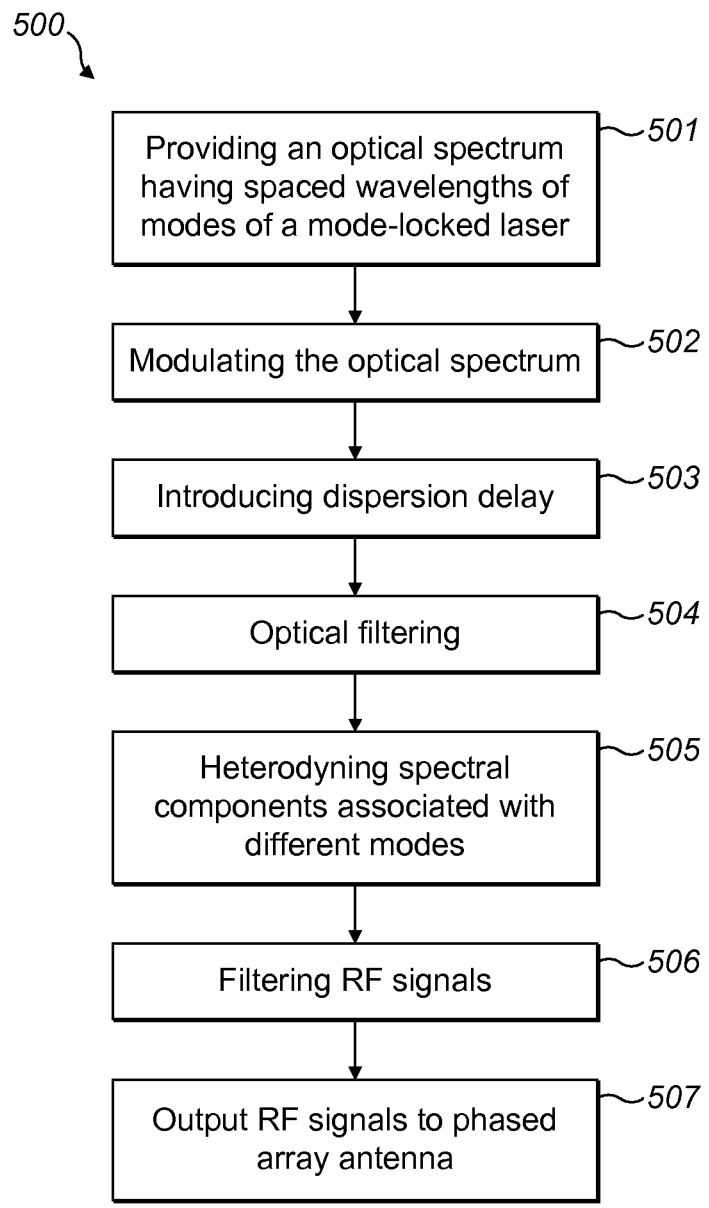
FIG. 5 is a method according to an aspect of the present invention.

FIG. 5 shows a further example method 500 according to an aspect of the invention. The method 500 is a method of generating a signal for a phased array antenna. In 501, the method comprises providing an optical spectrum comprising a plurality of spaced wavelengths. For example, the spaced wavelengths are mode wavelengths of a mode-locked laser, as described above.

In 502, the method comprises modulating the plurality of spaced wavelengths of the laser source with one or more modulating signals.

In 503, the method further comprises introducing a delay to spectral components of the optical spectrum. The time delay introduced is based on wavelengths of the laser light source, wherein the delay is dependent on the wavelength of the spectral components of the optical spectrum. In particular, the delay is introduced by dispersion. For example, the dispersion is introduced in a fiber, e.g. a DCF.

In 504, the method further comprises filtering the optical spectrum to select a part only of the optical spectrum. In some examples, the optical filter selects at least one pair of spectral components. For example, the optical filter selects a first pair of spaced wavelengths for generating a first frequency signal for the phase array antenna. In another example, the optical filter also selects a second pair of spaced wavelengths for generating a second frequency signal for the phase array antenna. The optical filtering, i.e. with the first filter 32 described above, selects at least the spectral components to provide the required time delay and frequency of RF signal after heterodyning. In some aspects, the first filter 32 selects other spectral components which are not used and subsequently filtered out.

Each first filter is configured to select spectral components to provide a same frequency RF signal to each element of the PAA. Each first filter is configured to select the spectral components such that a delay on each RF signal provides for beamforming.

In 505, the method comprises heterodyning the spectral components associated with different ones of the spaced wavelengths of the laser light source to generate a RF signal for the phased array. In particular, spectral components associated with different modes of the MLL are heterodyned together. The spectral components associated with a mode comprises the original mode wavelength and a wavelength resulting from modulation of that original mode wavelength. The difference between the spaced wavelengths, e.g. the spacing of the mode wavelengths is a radio frequency. Thus, the heterodyning generates an RF signal for the first time. The RF signal includes a time delay selected according to the wavelengths used to generate the RF signal. The frequency of the RF signal is also dependent on the wavelengths used to generate the RF signal.

In 506, the method further comprises filtering radio frequencies received from the heterodyning device to select one or more RF signals for the phased array antenna.

In 507, the generated RF signal is output to elements of the phased array antenna. One or more RF signals is output to each element, each RF signal having a time delay and frequency independent of other RF signals for that element. The time delay of each RF signal for an element is independently generated of the time delay for other of the plurality of elements. The RF signals are transmitted from the PAA in a beam.

Figure 6:
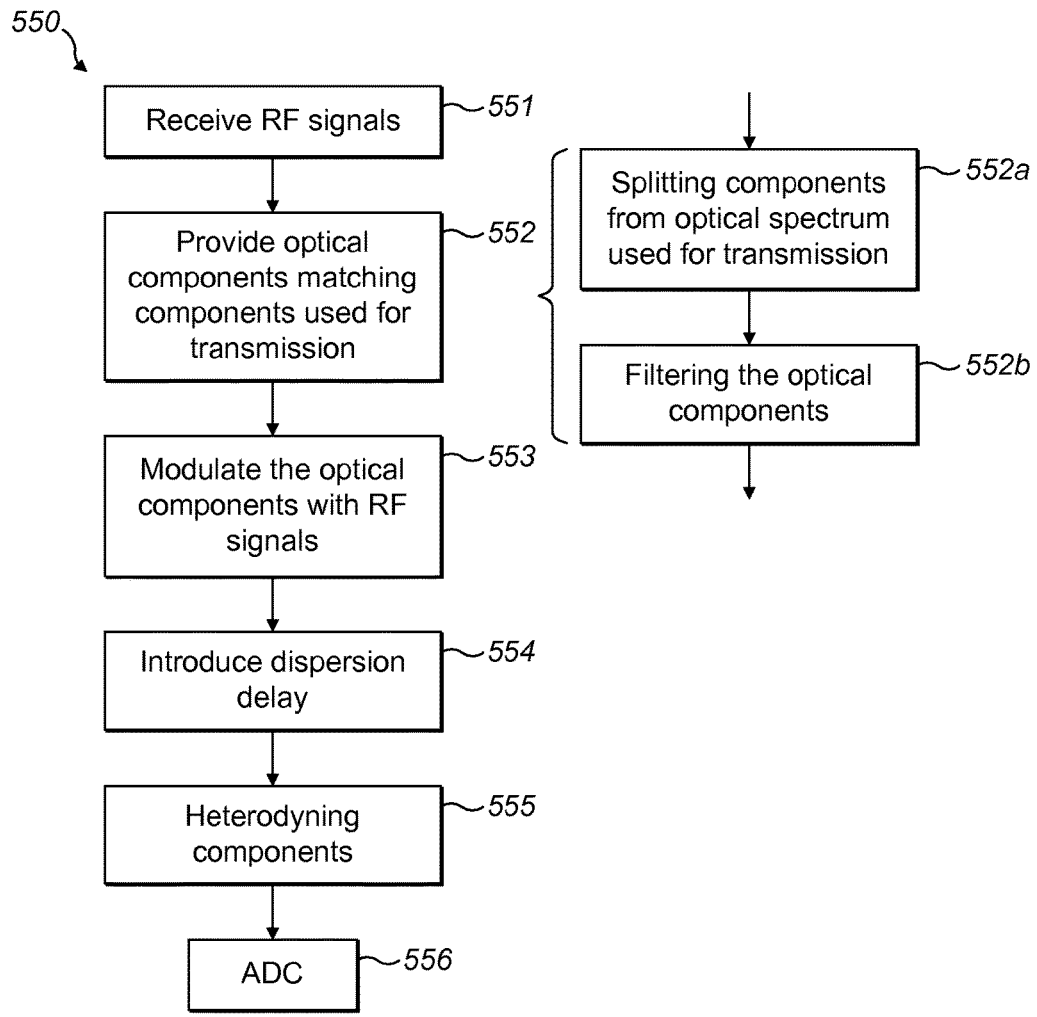
FIG. 6 is a method according to a further aspect of the present invention

FIG. 6 shows a further example method 550 according to an aspect of the invention. The method 550 is a method of receiving a signal from a phased array antenna.

In 551, the RF signals are received at a plurality of radiating elements. One or more radiating elements are associated with each antenna element unit.

In 552, optical components of the laser light source are provided to the antenna element units. The spectral components match those components used to generate the RF signals for transmission. In particular, the spectral components correspond to those spectral components heterodyned to form the transmission RF signals. The provided spectral components are not modulated. The spectral components are the MLL modes as generated in the base station. The provided spectral components match in frequency, e.g. correspond to the same MLL modes, as used to generate the RF signals for transmission.

The step 552 may be considered as comprising two sub-steps. In sub-step 552a, the method comprises a spitting of spaced wavelengths of the optical spectrum. The split spaced wavelengths include those wavelengths used for transmission. The splitting comprises the same spectral component being divided between a path to be used for transmission and a path used for receiving. In the embodiment of FIG. 1, this is a splitting following optical filtering (i.e. by the first filter) in the antenna element unit. The optical filtering selects a frequency range of spectral components to be used for transmission, and hence the splitting is downstream of such filtering. In the embodiment of FIG. 2, this is a splitting prior to modulation of the optical spectrum for transmission. The splitting is directly following generation or receiving of the optical spectrum, e.g. from the MLL. The spectral components for use in receiving are separately transmitted to the spectral components for transmission, from the base station to the antenna element unit.

In sub-step 552b, the method comprises filtering the spectral components. The filtering provides for the spectral components used for receiving match those used for transmission and/or provide for the spectral components used for receiving including only non-modulated spectral components (i.e. spaced wavelengths from the laser light source). In the embodiment of FIG. 1, this filtering selects the non-modulated spectral components. This is carried out in the antenna element unit 30. The filtering is performed on the split copy of the spectral components. The filtering may be with a periodic optical filter. In the embodiment of FIG. 2, this filtering selects the same frequency spectral components as used in transmission. For example, an OBPF selects the same range of spectral components as used in transmission.

In 553, the selected spectral components for receiving are modulated with the received RF signals. The modulation is carried out by the modulator 46.

In 554, dispersion delay is introduced to provide for receive beamforming. For example, this is carried out by transmitting the receive modulated spectral components through a fiber having the same dispersion characteristics as the fiber 8 used for transmission (for example using the same fiber).

In 555, the receive spectral components are heterodyned, e.g. in a photodiode 50. The heterodyning is configured to downconvert the RF signals to IF (or baseband). The heterodyning removes the RF component of the received signal.

In 556, the signal(s) at IF or baseband are converted from analogue to digital, e.g. by ADC 52.

The transceiver as described in any embodiment is able to up-convert or down-convert ultra-wideband signals at different frequency bands, even simultaneously. The transceiver 1 is configured and to manage steering through a true-time delay, even independently, both in transmission and in reception.

The transceiver combines the effectiveness of the optical beamforming with the high performance of the photonics-based RF generation and RF downconversion. This exploits the photonic subsystems in the RF transmitter.

Aspects of the invention relate to a UWB photonic system for simultaneous multi-band up- and down-conversion of wireless signals. This provides the capability of managing the beamforming of the signals at an arrayed antenna through a true-time delay approach, both in transmission and in reception. The transceiver may be capable of managing UWB multiprotocol signals at different frequency bands, for example, for future mobile networks. An example implementation of the transceiver may handle RF signals up to 100 GHz, with high and constant performance and low complexity. In some aspects, the transceiver 1 is configured to manage multiple signals simultaneously.

An aspect of the invention provides a computer program product, configured when run on a computer to carry out a method as described. For example, the computer is configured to control the tuning of one or more optical and/or electronic filters. The computer may comprise a processor and memory.

The transceiver is configured to implement a beamforming in both transmission and reception through a wideband TTD approach. The beamforming in reception is automatically implemented by the same filters and chromatic dispersion used for the transmission beamforming. The receiver beamforming only needs a single ADC, instead of one ADC for each antenna element as used in RF beamforming.

The transceiver is configured to allow the arrayed antenna to be remote with respect to the base station. The transceiver is configured to allow independent steering of multiple signals simultaneously. The transceiver is configured to provide for a continuous, full duplex operation. In some examples, the transceiver comprises a base station and an antenna station, wherein the dispersion unit is one or more optical fiber connecting the base station and antenna station. The laser light source is a single (and only) source of all the spaced wavelengths used in the transceiver for transmission and receiving of signals. The arrangement of the transceiver avoids the need to have multiple laser light sources.

The transceiver architecture is relatively compact, suitable for integration, and suitable to be employed in base stations of a radio access network and/or mobile devices.

The delay introduced for each RF frequency is independent of one or more other RF frequency. In particular, the relative delay or advance of the RF signals is independent of the frequency. For example, a first frequency RF beam (e.g. 10 GHz) is steered in the opposite (or same) direction as a second frequency RF beam (e.g. 40 GHz). Aspects of the invention provide for simultaneous independent beamsteering of the RF signals in a phased array antenna. The generation of multiple independent wideband RF signals is with high phase stability, free from the squint phenomenon, with high angular resolution and broad angular range.

Aspects of the present invention include in the same photonics-based functional block both the beamforming through TTD and the generation of the RF signal. This combines the effectiveness of the optical beamforming with the high performance of the photonics-based RF generation, advantageously using the photonics subsystem in the RF transmitter. In particular, examples integrate the functions of TTD beamforming and RF signal generation. Aspects of the invention generate multiple and wideband RF signals, e.g. over a wide range up to 100 GHz. The delay is controllable arbitrarily and independently.

The arrangement is robust to the squint effect that renders the RF signal dependent on the frequency. The arrangement allows obtaining high phase stability of the generated RF signals independently of the carrier frequency. Aspects of the invention are suitable for wideband and multi-carrier applications. A relatively large delay, and tunable delay, with high resolution can be applied to the signals. The multiple functionalities allow a reduction in the cost of the photonic system by utilizing the flexibility, wide bandwidth, and high stability of the system. The transceiver presents electromagnetic interference (EMI) immunity, low losses, and potential for low weight and power consumption. The transceiver directly generates the RF signal with the TTD already included.

A separate generation of RF signal, which requires conversion to an optical signal, is not required. The transceiver is configured to only generate the RF signal from a mix of spectral components associated with different ones of the spaced wavelengths (e.g. modes). In particular, the RF signal is not generated from a mix of two spectral components associated with the same one of the spaced wavelength, e.g. the RF signal is not generated from a mix of two spectral components associated with the same mode. For example, the RF signal is not generated by modulating a laser frequency with an RF signal, and mixing the modulated signal with the same laser frequency.

The extended use of photonics reduces the number of electro/optical and opto/electrical conversions. It is not necessary to generate an RF signal with which to modulate the laser source. For example, prior at photonics-based solutions require a functional block that converts the signal from the RF domain to the optical domain in order to implement the TTD functionality, and then converts back to the RF domain. The conversion of the signal results in an increased cost and complexity for the system. In aspects of the present invention, the use of an optical fiber provides a simple means for feeding of the antenna array. The optical fiber provides the further function of including the time delay.

Aspects of the invention may be used for RF transceivers with directional phased array antennas as multi-function multi-signal radars, radio links, communications, hybrid system for communications and surveillance. Aspects of the invention are used for beamforming of transmission and received signals.

In some examples, the transceiver comprises a processor configured to control the beamforming. In particular, the processor controls the modulation and/or one or more of the filters. For example, the processor controls the first filter 10 and/or second filter 14 to select the time delay and/or the RF frequency provided to the PAA elements 18. In some examples, the processor is arranged to access a memory of stored filter parameters to provide pre-determined beam angles and/or signal frequencies.

Aspects of the invention also comprise a phased array, comprising an antenna and transceiver as described above. The antenna comprises a plurality of elements, for which RF signals having a determined true time delay and frequency are provided by, and received for, the transceiver as described in any example of the invention.

The first filter 232 is been described as having a single output to the photodiode. Alternatively, the first filter 232 has a plurality of outputs. The first filter 232 is configured to output a different passband or selected modes to different outputs. Each output is connected to an optical heterodyning device, e.g. photodiode. In some examples, only the desired mode pairs are output (i.e. without intermediate modes if the desired modes are non-adjacent).

In some examples, a plurality of outputs each provide one mode pair (including associated modulation wavelengths) only. In this case the second filter after the photodiode is not necessary. For example, the first filter 232 is configured (programmed) to route to one output port a pair of modes having a first spacing (e.g. 10 GHz-spaced modes) and to another output port a pair of modes having a second spacing (e.g. 40 GHz-spaced modes).

Alternatively, a plurality of output ports are arranged to each output a pair of modes with a first spacing and a pair of modes with a second spacing.

Due to baseband modulation, there are no IF spectral components. The BPFs after the photodiodes are not necessary, and so may not be included in the transceiver. In some aspects, the modulator is configured such that the optical spectrum after the modulator comprises only modulated modes. In some examples, the optical spectrum does not comprise separate modulation sidebands. The applied modulation may be on-off modulation. The applied modulation is at baseband. The beating between any of the modulated modes results in a RF signal with up-converted on-off modulation. In this case, only the first filter is required to select the signals for the PAA (e.g. second may not be present).

The spectral components may be any combination of modulated sidebands (e.g. from modulation with an IF signal) or spectral components with a wavelength generated directly by the laser light source. The spectral component may or may not be shifted by an Intermediate Frequency, optionally carrying a modulation. For example, one or both the spectral components which are heterodyned for use in the phased array antenna may be an unmodulated wavelength as generated by the laser light source, e.g. a wavelength of a laser mode. Alternatively or in addition, one or both the spectral components may be a modulated signal.

The modulated wavelength may have a frequency which is different to or substantially the same as the frequency of the wavelength provided by the laser light source, e.g. the mode wavelengths. For example, the modulation may or may not generate a separate modulation sideband. In some aspects, the modulation may be included in an IF signal (frequency of spectral component different to the associated unmodulated mode) or included in a baseband signal (frequency of spectral component not substantially different or separate from the associated unmodulated mode). Both IF and baseband signals may be referred to as sidebands, e.g. modulation sidebands.

In some aspects, a said spectral component associated with the spaced wavelength is a modulated sideband of the spaced wavelength and/or a said spectral component associated with the spaced wavelength is a wavelength generated by the laser light source, and optionally, is a mode wavelength of a mode-locked laser.

In some aspects, at least one of the two spectral components which is mixed is modulated. In particular, the RF signal is from a mix of two laser mode wavelengths with at least one of the laser mode wavelengths modulated. Alternatively, both of the spectral components which are mixed and selected are modulated. Alternatively, neither of the spectral components which are mixed and selected are modulated.

The laser source has been described as a mode-locked laser. Alternatively, any one or more suitable sources of laser light arranged to provide wavelengths of a pre-determined separation may be used.

In some examples, the transceiver comprises the laser generating the laser light. In other aspects, the transceiver receives the laser light, but does not comprise the laser itself. The term laser source refers to any source of laser light, whether that is the laser itself or an input of laser light from a functionally external laser.

In some examples of the invention, the modulator 4 is not present. The laser source 2 is connected directly to the fiber 8. This provides for generation of simple continuous waves, instead of modulated signals.

The phased array antenna may alternatively be referred to as a phased array. The phased array may be considered as comprising a plurality of antennas (i.e. described above using the term 'element').

The invention claimed is:
1. A transceiver for a phased array antenna, comprising:
a laser light source arranged to provide an optical spectrum comprising a plurality of spaced wavelengths,
a dispersion unit to introduce a delay to a plurality of spectral components of the optical spectrum associated with the spaced wavelengths, wherein the delay is dependent on the wavelength of the spectral components of the optical spectrum,
a first optical filter to select a plurality of spectral components received from the dispersion unit,
a first heterodyning device to generate a signal for transmission by the phased array antenna by heterodyning the selected spectral components associated with different ones of the spaced wavelengths of the laser light source, wherein the transceiver is configured to receive signals from the phased array antenna, the transceiver comprising a modulator configured to modulate said spaced wavelengths from the said laser light source with the received signals, wherein the spaced wavelengths are associated with the spectral components used to generate the signal for transmission, and a second heterodyning device to heterodyne spectral components associated with different ones of the spaced wavelengths of the laser light source.

2. The transceiver as claimed in claim 1 wherein the transceiver is configured to introduce a delay to the plurality of spaced wavelengths modulated with the received signals, wherein the delay is dependent on the wavelength of the spectral components of the optical spectrum.

3. The transceiver as claimed in claim 1 wherein the transceiver is configured to introduce a delay to the plurality of spaced wavelengths modulated with the received signal with the same chromatic dispersion characteristics of the dispersion unit used in transmission.

4. The transceiver as claimed in claim 1 wherein the second heterodyning device is configured to output a signal downconverted from the received signal.

5. The transceiver as claimed in claim 1 wherein the transceiver comprises a splitter configured to split spaced wavelengths of the optical spectrum used for transmission, wherein the splitter is configured to provide the split spaced wavelengths for receiving signals from the phased array antenna.

6. The transceiver as claimed in claim 5 wherein the splitter is downstream of the first optical filter configured to select a frequency range of spectral components to be used for transmission.

7. The transceiver as claimed in claim 5 wherein the splitter is upstream of a modulator configured to modulate the optical spectrum for transmission.

8. The transceiver as claimed in claim 1 wherein the transceiver comprises a second optical filter configured to select spaced wavelengths of the laser light source with a same frequency range of optical spectrum as the first optical filter.

9. The transceiver as claimed in claim 1 wherein the transceiver comprises a second optical filter configured to select only the spaced wavelengths corresponding with the spectral components used for transmission.

10. The transceiver as claimed in claim 9 wherein the second optical filter is a periodic optical filter.

11. The transceiver as claimed in claim 1 comprising a base station and an antenna station, wherein the dispersion unit is one or more optical fiber connecting the base station and antenna station.

12. The transceiver as claimed in claim 11 wherein the same optical fiber is configured to carry modulated optical spectral components in transmission and modulated optical spectral components in receive.

13. The transceiver as claimed in claim 1 wherein the laser light source comprises a mode-locked laser configured to provide the optical spectrum having the plurality of spaced wavelengths, wherein the spaced wavelengths correspond to laser modes, and the heterodyning device is configured to heterodyne spectral components associated with different modes.

14. The transceiver as claimed in claim 1 wherein the first optical filter is configured to select at least one pair of spaced wavelengths each having at least one associated spectral component for generating the signal for transmission by the phased array antenna.

15. The transceiver as claimed in claim 1 wherein the first optical filter is configured to select a first pair of spaced spectral components for generating a first frequency signal for transmission by the phase array antenna, and optionally, a second pair of spaced spectral components for generating a second frequency signal for transmission by the phase array antenna.

16. The transceiver as claimed in claim 1 wherein the transceiver comprises one or more radio frequency, RF, filter arranged to receive an RF signal from the heterodyning device and select one or more RF signals for transmission by the phased array antenna.

17. The transceiver as claimed in claim 1 wherein the laser light source is a single source of all the spaced wavelengths used in the transceiver for transmission and receiving of signals.

18. A method of generating and receiving a signal in a transceiver for a phased array antenna, comprising:

providing an optical spectrum comprising a plurality of spaced wavelengths, introducing a delay to a plurality of spectral components of the optical spectrum associated with the spaced wavelengths, wherein the delay is dependent on the wavelength of the spectral components of the optical spectrum, optical filtering to select a plurality of spectral components including the delay, heterodyning the selected spectral components associated with different ones of the spaced wavelengths of the laser light source to generate a signal for transmission by the phased array antenna, receiving signals from the phased array antenna, modulating spaced wavelengths of the said optical spectrum with the received signals, wherein the spaced wavelengths are associated with the spectral components used to generate the signal for transmission, and heterodyning spectral components associated with different ones of the spaced wavelengths of the laser light source.

19. The method as claimed in claim 18 comprising introducing a delay to the plurality of spaced wavelengths modulated with the received signal, wherein the delay is dependent on the wavelength of the spectral components of the optical spectrum.

20. The method as claimed in claim 18 comprising introducing a delay to the plurality of spaced wavelengths modulated with the received signal with the same chromatic dispersion characteristics of the dispersion unit used in transmission.

21. The method as claimed in claim 18 wherein the heterodyning downconverts the received signal.

22. The method as claimed in claim 18 comprising splitting spaced wavelengths of the optical spectrum used for transmission, and providing the split spaced wavelengths for receiving signals from the phased array antenna.

23. The method as claimed in claim 22 comprising splitting following the optical filtering to select a frequency range of spectral components to be used for transmission.

24. The method as claimed in claim 22 comprising splitting prior to a modulating of the optical spectrum for transmission.

25. The method as claimed in claim 18 comprising optical filtering to select spaced wavelengths of the laser light source with a same frequency range of optical spectrum as used for transmission.

26. The method as claimed in claim 18 comprising optical filtering to select only the spaced wavelengths corresponding with the spectral components used for transmission.

27. The method as claimed in claim 26 wherein the optical filtering uses a periodic optical filter.

28. The method as claimed in claim 18 comprising sending optical signals for transmission and sending optical signals for reception through one or more optical fiber introducing a delay between a base station and an antenna station.

29. The method as claimed in claim 18 wherein the same optical fiber carries modulated optical spectral components in transmission and modulated optical spectral components in reception.

30. The method as claimed in claim 18 wherein the providing an optical spectrum comprising a plurality of spaced wavelengths is by a mode-locked laser, wherein the spaced wavelengths correspond to laser modes, and the heterodyning comprises heterodyning spectral components associated with different modes.

31. The method as claimed in claim 18 wherein the optical filtering selects at least one pair of spaced wavelengths each having at least one associated spectral component for generating the signal for the phased array antenna.

32. The method as claimed in claim 18 wherein the optical filtering selects a first pair of spaced spectral components for generating a first frequency signal for the phase array antenna, and optionally, a second pair of spaced spectral components for generating a second frequency signal for the phase array antenna.

33. The method as claimed in claim 18 comprising radio frequency, RF, filtering to select one or more RF signals from the heterodyning device for the phased array antenna.

34. The method as claimed in claim 18 wherein the providing an optical spectrum comprising a plurality of spaced wavelengths is providing from a single source all the spaced wavelengths used in the transceiver for transmission and receiving of signals.

35. A computer program product, configured when run on a computer to carry out a method according to claim 18.

* * * * *